United States Patent
Polden et al.

(10) Patent No.: US 12,523,614 B2
(45) Date of Patent: Jan. 13, 2026

(54) READER FOR ANALYSING FLUORESCENT MARKERS

(71) Applicant: INTELLIGENT FINGERPRINTING LIMITED, Cambridge (GB)

(72) Inventors: John Polden, Cambridge (GB); Mark Hudson, Cambridge (GB); Sanjoy Chakraborty, Cambridge (GB); Abhishek Ambekar, Cambridge (GB); Clive Styler, Cambridge (GB); Euan Morrison, Cambridge (GB); Paulo Pinheiro, Cambridge (GB); Ross Jones, Cambridge (GB)

(73) Assignee: INTELLIGENT FINGERPRINTING LIMITED, Cambridge (GB)

( * ) Notice: Subject to any disclaimer, the term of this patent is extended or adjusted under 35 U.S.C. 154(b) by 719 days.

(21) Appl. No.: 17/904,887

(22) PCT Filed: Feb. 25, 2021

(86) PCT No.: PCT/GB2021/050483
§ 371 (c)(1),
(2) Date: Aug. 24, 2022

(87) PCT Pub. No.: WO2021/171023
PCT Pub. Date: Sep. 2, 2021

(65) Prior Publication Data
US 2023/0087664 A1    Mar. 23, 2023

(30) Foreign Application Priority Data
Feb. 28, 2020    (GB) ................................ 2002859

(51) Int. Cl.
*G01N 21/84*    (2006.01)
*G01N 21/64*    (2006.01)
*G01N 33/543*    (2006.01)

(52) U.S. Cl.
CPC ..... *G01N 21/8483* (2013.01); *G01N 21/6428* (2013.01); *G01N 33/54387* (2021.08);
(Continued)

(58) Field of Classification Search
CPC ... G01N 2021/6439; G01N 2021/7759; G01N 2021/7786; G01N 21/274; G01N 21/6428;
(Continued)

(56) References Cited

U.S. PATENT DOCUMENTS

2006/0118742 A1*  6/2006  Levenson .......... G01N 21/4795
                                                   250/559.3
2013/0184188 A1   7/2013  Ewart et al.
(Continued)

FOREIGN PATENT DOCUMENTS

AU    2016340039 A1    3/2018

OTHER PUBLICATIONS

Wilkinson et al: "Shading correction and calibration in bacterial fluorescence measurement by image processing system", Computer Methods and Programs in Biomedicine, Elsevier, Amsterdam, NL, vol. 44, No. 2, Aug. 1, 1994 (Aug. 1, 1994), pp. 61-67, XP026654869, ISSN: 0169-2607, DOI: 10.1016/0169-2607(94)90086-8 [retrieved on Aug. 1, 1994].

Primary Examiner — Jennifer Wecker
Assistant Examiner — Jonathan Bortoli
(74) Attorney, Agent, or Firm — Lando & Anastasi, LLP

(57) ABSTRACT

A device configured to provide a value indicative of fluorescent emission from a substrate 5 having a test region is provided. The device comprises an electromagnetic radiation source configured to emit excitation radiation towards the test region to excite fluorescent emission from a fluorescent material in the test region. The electromagnetic radiation source is configured such that a variation in
(Continued)

intensity of the excitation radiation across the test region is less than 15%. The device further comprises a sensor configured to capture a primary 10 image of the fluorescent emission, and a controller configured to modify the primary image based on calibration data and to use the modified image to obtain the value indicative of the fluorescent emission.

13 Claims, 16 Drawing Sheets

(52) U.S. Cl.
CPC ............... *G01N 2021/6439* (2013.01); *G01N 2201/12746* (2013.01)

(58) Field of Classification Search
CPC .... G01N 21/6456; G01N 21/77; G01N 21/78; G01N 21/8483; G01N 2201/12746; G01N 33/54387; G01N 2021/757; G01N 33/53; G01N 33/543; G01N 33/558; G01N 33/582; A61B 5/0071; G06T 7/0014
See application file for complete search history.

(56) References Cited

U.S. PATENT DOCUMENTS

| | | |
|---|---|---|
| 2014/0227681 A1 | 8/2014 | Fleming et al. |
| 2018/0246038 A1* | 8/2018 | Hunter ................. G01N 21/274 |
| 2020/0209061 A1* | 7/2020 | Garsha ...................... G06T 7/80 |
| 2021/0088443 A1* | 3/2021 | Diamond .............. G06T 7/0016 |

* cited by examiner

READER FOR ANALYSING FLUORESCENT MARKERS

CROSS-REFERENCE TO RELATED APPLICATIONS

This application is a U.S. national phase application and claims the benefit of priority under 35 U.S.C. § 371 of International Patent Application Serial No. PCT/GB2021/050483, titled "READER FOR ANALYSING FLUORESCENT MARKERS" and filed on Feb. 25, 2021 which, in turn, claims priority to United Kingdom Patent Application Serial No. GB2002859.3, filed on Feb. 28, 2020.

FIELD OF THE DISCLOSURE

The disclosure relates to the field of analysing fluorescent markers.

BACKGROUND

Fluorescent tags are commonly used to aid detection of biomolecules such as proteins or antibodies, and use a fluorescent chemical compound known as a fluorophore. The fluorophore is chosen such that it selectively binds to a specific region or functional group on the target molecule or analyte. Fluorophores can re-emit light upon light excitation; they absorb electromagnetic radiation at a specific band of wavelengths and re-emit electromagnetic radiation at a band of longer wavelengths. Fluorophores can be printed onto a substrate, for example in strips to test for different analytes.

It is known to provide a device that can both activate the fluorescent marker the test substrate and then detect and quantify the fluorescent emission. A single-point illumination and detection probe is mechanically scanned along the test substrate, sampling the fluorescent emission. The probe illuminates the substrate with excitation radiation that is within the excitation band of wavelengths for the fluorophore and detects fluorescent radiation that is within the emission band of wavelengths for the fluorophore. The probe scans over several lines, and the device calculates an average of the line scans to produce a graph of fluorescence intensity across the test substrate. For example, for a test substrate with fluorophore printed into strips then the probe may scan three times across each test strip. The average of the three scans is intended to be indicative of the total intensity of each test strip. The measurement can take several minutes.

A device that can image the entirety of the test substrate is beneficial, since the distribution of the fluorophore, for example in a test strip, may not be uniform. Imaging the full 2D space of the strip therefore ensures that errors arising from sampling a non-uniform distribution are eliminated. An accurate indication of the intensity of the fluorescent emission from a give strip can be obtained. Capturing an image of the entire test substrate also ensures that every region of the substrate is measured at the same point in time, eliminating any errors which may occur due to the time evolution of fluorescent emission. Such a system would be robust, due to lack of moving parts, as well as cost effective.

In order to achieve these benefits a device should be able to achieve as uniform illumination as possible across the fluorescing areas of the test substrate, and be able to remove any residual variation in illumination uniformity by calibration.

SUMMARY OF THE DISCLOSURE

Against this background, there is provided: a device configured to provide a value indicative of fluorescent emission from a substrate having a test region, the device comprising an excitation radiation source configured to emit excitation radiation towards the test region to excite fluorescent emission from a fluorescent material in the test region, the excitation radiation source configured such that a variation in intensity of the excitation radiation across the test region is less than 15%; a sensor having a field of view covering the test region and configured to capture a primary image of the fluorescent emission; and a controller configured to modify the primary image based on calibration data indicative of variations in intensity of the excitation radiation to produce a modified image; and to use the modified image to obtain the value indicative of fluorescent emission.

In this way, it is possible to obtain reliable values indicative of fluorescent emission using a static sensor that obtains an image of the full substrate and without moving the substrate relative to the sensor.

Optionally, the device comprises a beam splitter that transmits the electromagnetic excitation radiation emitted by the electromagnetic radiation source and reflects the fluorescent emission.

The device may further comprise a narrow band pass filter centred about the wavelength of the fluorescent emission.

The device may further comprise a filter that limits transmission of electromagnetic radiation that has a range of wavelengths that overlaps with the wavelengths of the fluorescent emission.

The variation in intensity of the electromagnetic excitation radiation across the test region may be less than 5%, preferably less than 4%, or more preferably less than 3%, or still more preferably less than 2%.

The electromagnetic excitation radiation across the test region may be above a threshold of intensity.

The controller may be configured to correct for non-uniformities in the illumination field by dividing the measured image pixel-by-pixel by the calibration reference data.

The controller may be further comprised to remove a background signal from the data.

The test region may comprise a control strip and a test strip.

The controller may be configured to obtain a first value indicative of fluorescent emission of the test strip and a second value indicative of fluorescent emission of the control strip, and to divide the first value by the second value to provide a ratio.

The ratio may be compared to a threshold value.

The test strip may be one of a plurality of test strips.

The calibration data may be derived from measurement of fluorescent emission of a calibration substrate and is a measurement indicative of variation in the intensity of the electromagnetic excitation radiation from the electromagnetic radiation source.

The device may comprise a calibration substrate with a uniform fluorescing element that has spectral emission a range of wavelengths that has a high degree of overlap with the range of wavelengths emitted by the fluorescent substance on the test region of the substrate.

The sensor may comprise a CMOS sensor.

The light source may comprise two LEDs.

The light source may comprise one or more blue LEDs.

The disclosure also provides a method of obtaining a value indicative of fluorescent emission from a substrate having a test region, the method comprising:

a. exciting fluorescent emission from a fluorescent material in the test region with electromagnetic excitation radiation, wherein the variation in intensity of the electromagnetic excitation radiation across the test region is less than 15%;
b. capturing a primary image of the test region with a sensor configured to have a field of view covering the test region;
c. modifying the primary image based on calibration data indicative of variations in intensity of the electromagnetic excitation radiation to produce a modified image;
d. using the modified image to obtain the value indicative of the fluorescent emission of the test region.

Optionally, the filters may remove electromagnetic radiation that is not emitted by the fluorescent material from the electromagnetic radiation incident on the sensor.

The fluorescent material may be excited by electromagnetic excitation radiation that has a variation in intensity across the test region that is less than 5%.

The data regarding fluorescent emission from a substrate may be obtained for a test region comprising a control strip and one or more test strips.

The calibration reference data may be derived from a measurement of a calibration substrate.

The step of using calibration reference data to correct for non-uniformities in the illumination field may comprise dividing a test image pixel-by-pixel by the calibration reference data.

The method may comprise removing a background signal.

The method may comprise obtaining a first value indicative of fluorescent emission of the test strip and a second value indicative of fluorescent emission of the control strip; dividing the first value by the second value to provide a ratio; and comparing the ratio to a threshold value.

BRIEF DESCRIPTION OF THE DRAWINGS

A specific embodiment of the disclosure will now be described, by way of example only, with reference to the accompanying drawings in which:

FIG. 14 shows the integration of the 1D trace.

DETAILED DESCRIPTION

Figure 1:
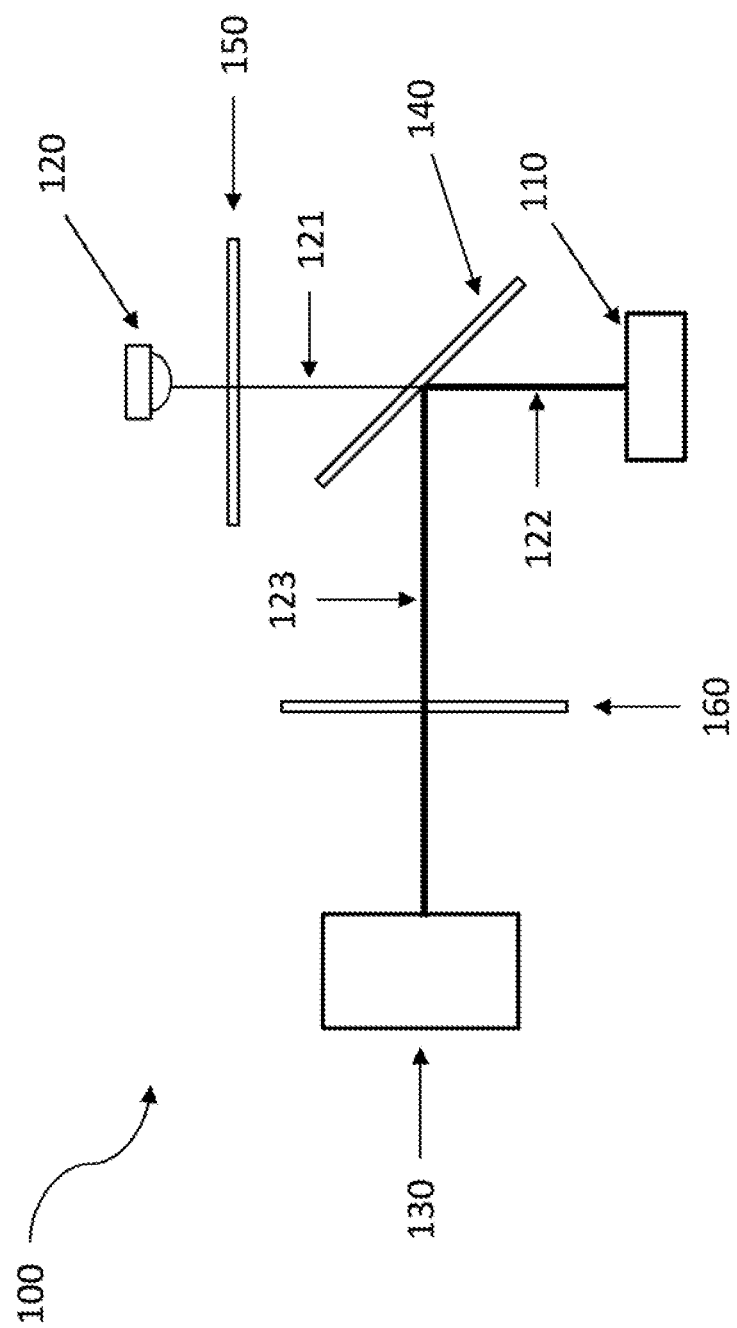
FIG. 1 shows a schematic diagram of the device according to an embodiment of the disclosure.

According to an embodiment of this disclosure, a device 100 is provided to produce a value indicative of fluorescent emission from a substrate 110 having a fluorescent material in a test region. With reference to FIG. 1, an electromagnetic radiation source 120 emits excitation radiation 121, which is electromagnetic radiation with a wavelength suitable for exciting the fluorescent material. The excited fluorescent material emits fluorescent radiation 122, which may also be referred to as fluorescent emission. The device also comprises a sensor 130 configured to capture an image of the substrate 110. The field of view of the sensor 130 covers the whole substrate 110.

The device further comprises a beam splitter 140 that transmits excitation radiation 121, and reflects fluorescent radiation 122.

The device further comprises a filter 150 that limits transmission of radiation with wavelengths overlapping with the fluorescent radiation 122, and a filter 160 that transmits only fluorescent radiation 122.

Figure 2:
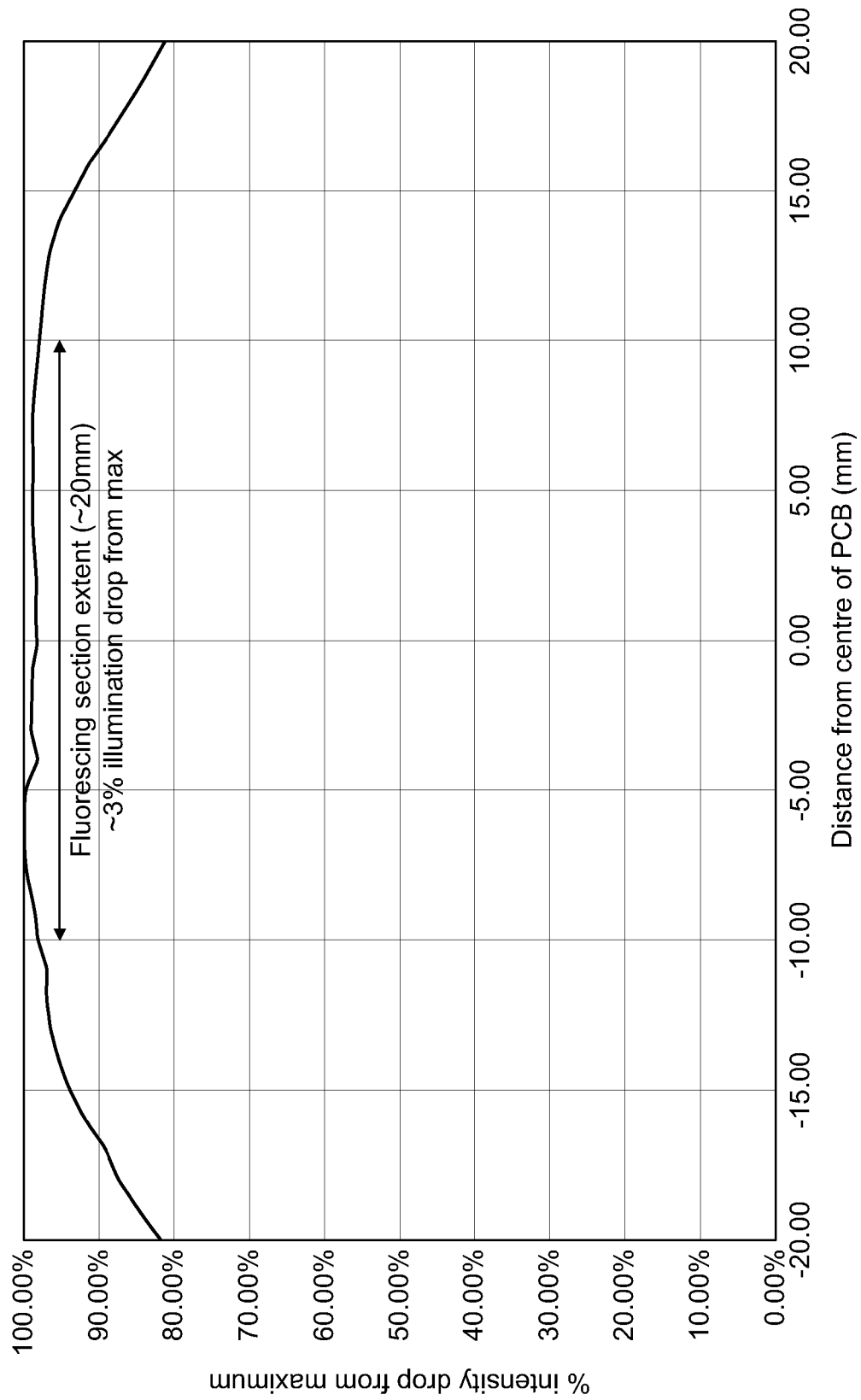
FIG. 2 shows the variation of intensity of excitation radiation at the substrate as a function of distance from the centre of the substrate according to an embodiment of the disclosure.

In a specific embodiment of the disclosure in accordance with FIG. 1, the electromagnetic radiation source 120 is designed such that the excitation radiation 121 has a high degree of uniformity over the substrate 110. The variation in intensity of the excitation radiation across the substrate 110 may be less than 15%. More preferably, the variation in intensity of the excitation radiation across the substrate 110 may be less than 5%, or more preferably still less than 4%, or more preferably still less than 3%. In a certain embodiment, the electromagnetic radiation source 120 is designed such that the variation in intensity of the excitation radiation across the substrate 110 is expected not to exceed 1.8%. The experimental results for this embodiment give an actual variation in intensity of the excitation radiation across the substrate 110 of 3%. In this embodiment the electromagnetic radiation source comprises two LEDs, and the difference between the calculated and measured variation may be due to the LEDs not being identical. FIG. 2 shows the measured variation in intensity of the excitation radiation across the substrate 110. The arrow shows the extent of the substrate 110, at the edge of which the intensity drop from the maximum is 3%.

Figure 3:
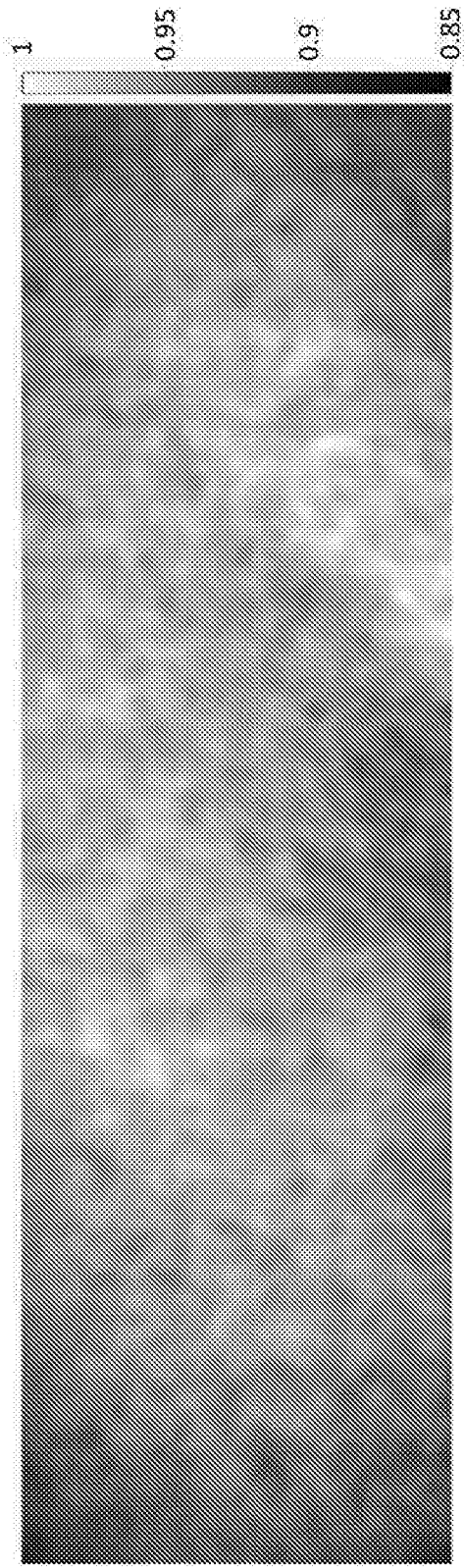
FIG. 3 shows the variation of intensity of fluorescent radiation from a calibration substrate with a uniform fluorescing element, when illuminated with excitation radiation according to an embodiment of the disclosure.

The variation in intensity of the excitation radiation 121 can be measured using a calibration substrate that is covered in a uniform fluorescing material. The variation in intensity of fluorescent radiation 122 is shown in FIG. 3, and is clearly larger than the variation in intensity of the excitation radiation 121. The intensity of fluorescent emission at the edge of the test substrate dimension is 8% less than the maximum, however the variation is similar in shape to that of the excitation radiation 121, with a flat intensity across most of the substrate and dropping near to the edges.

Figure 4:
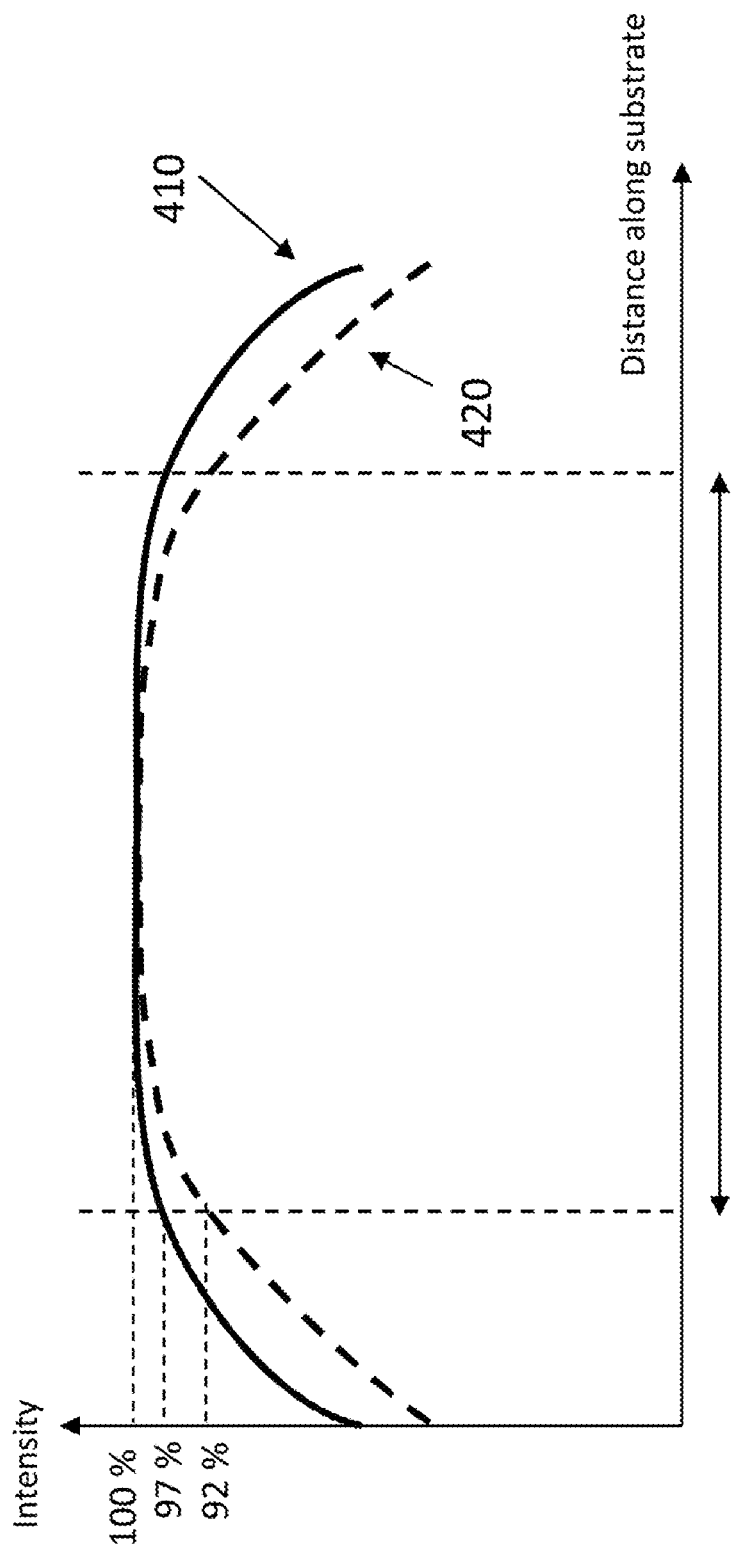
FIG. 4 shows the intensity variation of the excitation radiation and fluorescent radiation as a function of distance along the calibration substrate, wherein the solid line represents the excitation radiation that excites the uniform fluorescent material on the calibration substrate and the dashed line represents the resulting fluorescent emission according to an embodiment of the disclosure.

A comparison of the intensity of the excitation radiation 121 at the substrate 110 and the intensity of the fluorescent emission of the calibration substrate is shown in FIG. 4. The arrow and dashed vertical lines indicate the edges of the test substrate 110. The solid curve 410 indicates the intensity of the excitation radiation 121, and the dashed curve 420 indicates the intensity of the fluorescent radiation 122. Both are flat at the central portion of the substrate, and drop off at the edges of the substrate. In a certain embodiment, the intensity of the excitation radiation 121 drops by 3% at the edge of the substrate and the intensity of the fluorescent emission drops by 8% at the edge of the substrate.

Referring again to FIG. 1, the beam splitter 140 and filters 150 and 160 are arranged to minimise the likelihood of radiation other than fluorescent radiation being incident on the sensor 130. The beam splitter 140 is arranged such that it transmits excitation radiation 121 from the electromagnetic radiation source 120 towards the substrate 110. The excitation radiation 121 excites the fluorescent material on the substrate 110, which emits fluorescent radiation 122 towards the beam splitter 140. The beam splitter 140 reflects the fluorescent radiation 122 towards the sensor 130.

Although excitation radiation 121 is chosen to have a range of wavelengths that are centred away from the emission wavelength of the fluorescent material, the emission band of the electromagnetic radiation source 120 may overlap with the emission spectrum of the fluorescent material. The filters 150 and 160 are therefore an additional measure in seeking to minimise the likelihood of radiation other than fluorescent radiation reaching the sensor 130. The filter 150 limits transmission of electromagnetic radiation that has wavelengths close to the emission wavelengths of the fluorescent material. Filter 150 is positioned such that the electromagnetic radiation that is incident on the substrate 110 substantially excludes wavelengths that are similar to the wavelengths of the fluorescent emission. This means that light that is reflected from the substrate 110 and is incident on the beam splitter 140 will be transmitted and not reflected towards the sensor 130.

Filter 160 is a narrow band pass filter 160 that has maximum transmission at the emission wavelength of the fluorescent material. Filter 160 is positioned between the beam splitter 140 and the sensor 130 to filter electromagnetic radiation 123, to further minimise the likelihood of radiation other than fluorescent radiation being incident on the sensor 130.

Figure 5:
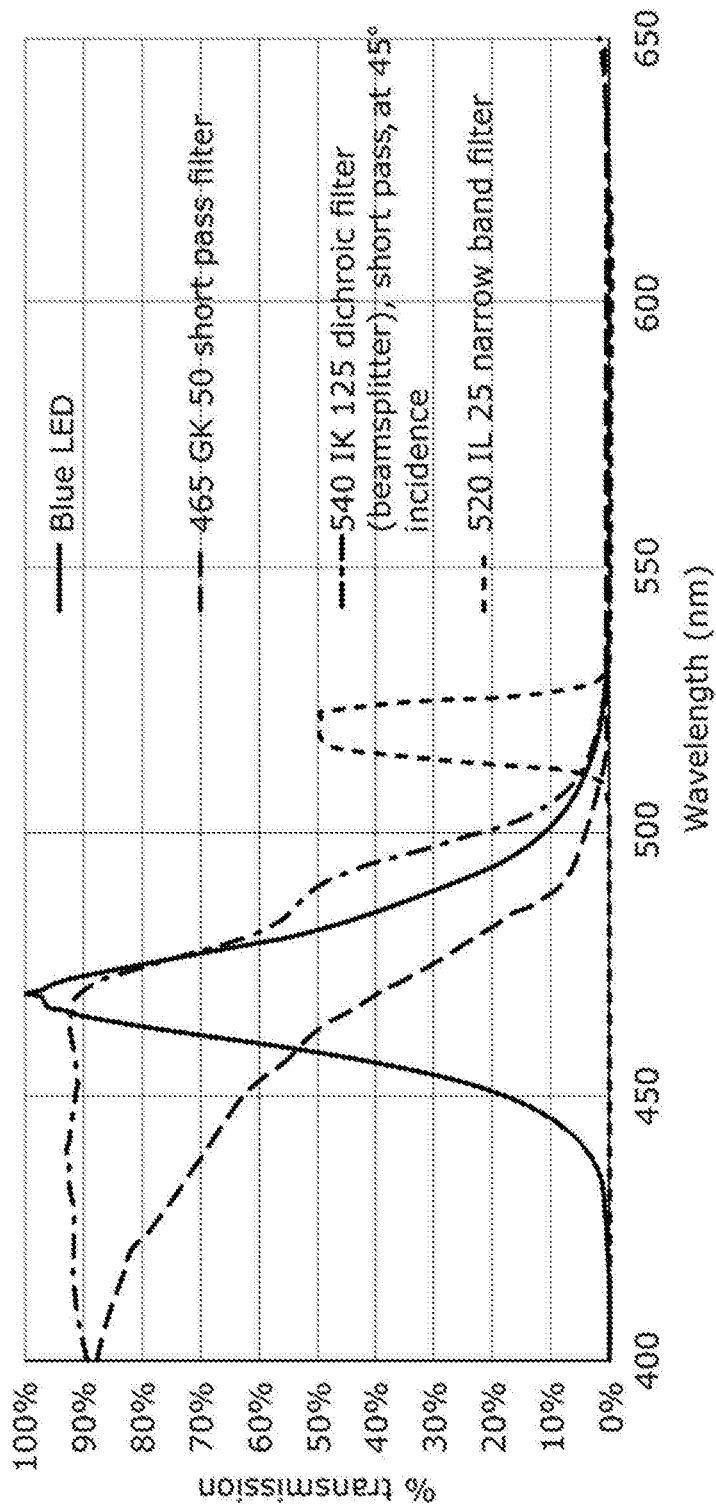
FIG. 5 shows the emission spectrum for an LED used as the electromagnetic radiation source and the transmission spectra for the filters used according to a certain embodiment of the disclosure.

FIG. 5 shows, for an embodiment of the invention, the wavelengths of the emission radiation, the fluorescent radiation, as well as the wavelength of the filters. In this embodiment, the electromagnetic radiation source 120 is a blue LED, with excitation radiation 121 having a band of wavelengths centred at 470 nm (solid line in FIG. 5). The fluorescent material used in this embodiment has fluorescent radiation 122 centred at a wavelength of 520 nm. The beam splitter 140 (dash-dot line in FIG. 5) is a dichroic filter that transmits electromagnetic radiation at wavelengths equal to or smaller than that of the excitation radiation 121 from the electromagnetic radiation source 120, and reflects electromagnetic radiation at wavelengths equal to or longer than the fluorescent radiation 122. The filter 150 that limits transmission of electromagnetic radiation with wavelengths close to the fluorescent emission is a short pass filter (long dashed line in FIG. 5). The narrow band pass filter is centred at 520 nm (short dashed line in FIG. 5).

Figure 6:
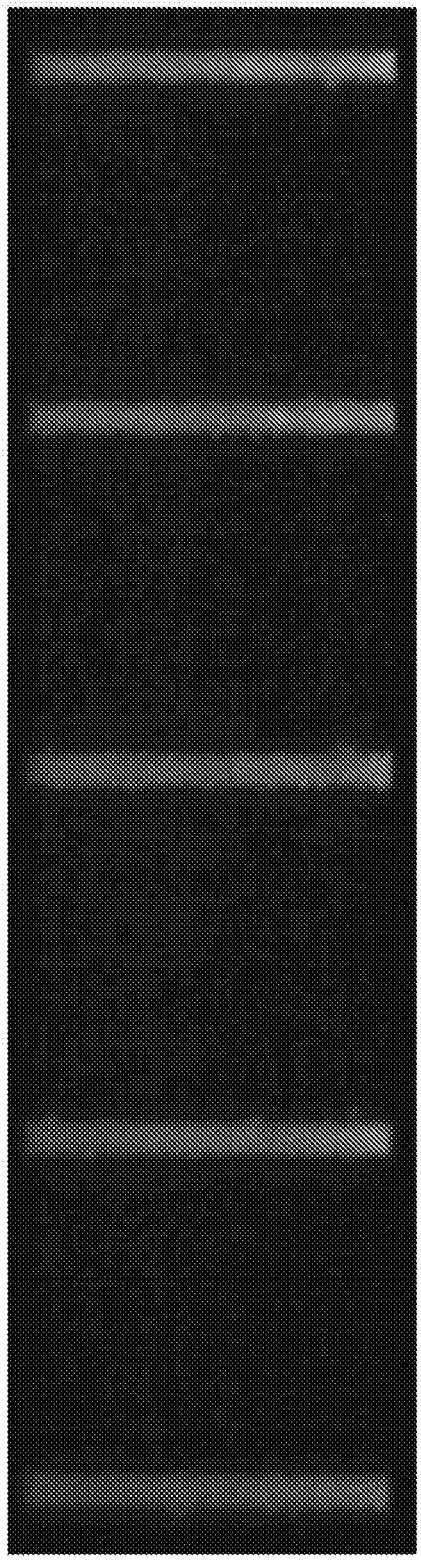
FIG. 6 shows a test substrate comprising strips of fluorescent material in accordance with a certain embodiment of the disclosure.

FIG. 6 shows a test substrate to be imaged by a certain embodiment of the disclosure. The test substrate has a plurality of strips of fluorescent material. One of the plurality of strips may be a control strip while the remaining strips of the plurality of strips may be test strips, potentially with each test strip being for a different analyte. In a certain embodiment, the test substrate may have dimensions 23 mm by 4.4 mm.

As described above, the electromagnetic radiation source 120 is designed such that the excitation radiation 121 has a high degree of uniformity across the substrate 110. An embodiment in which the excitation radiation has very high uniformity may not have sufficient intensity of excitation radiation to excite the fluorescent material, so there is a compromise to be made between uniformity and mean intensity of the excitation radiation. In an embodiment, the electromagnetic radiation source may be designed such that the excitation radiation 121 has a high degree of uniformity over the substrate 110 and has a mean intensity at the substrate 110 above a threshold. In a certain embodiment the electromagnetic radiation source 120 may comprise one or more LEDs. There may be two LEDs, with the spacing between the LEDs and distance to the substrate optimized to give maximum uniformity of intensity of excitation radiation across the substrate without dropping below a threshold of illumination efficiency. In a certain embodiment the LEDs may be blue LEDs with emission wavelengths centred at 570 nm. The LEDs may be placed 28 mm apart and 42 mm from the substrate, giving a calculated intensity variation across the substrate of 1.8% and a measured intensity variation across the substrate of 3%. In a certain embodiment, a maximum and minimum threshold of mean intensity of excitation radiation 121 at the substrate 110 may be derived from calibration substrates. In a certain embodiment, a threshold of uniformity of excitation radiation 121 at the substrate 110 may be derived from a calibration substrate.

In certain embodiments the sensor 130 may comprise a CMOS sensor. The sensor 130 may comprise a plurality of sensing elements, with a total field of view covering the substrate 110.

Figure 7:
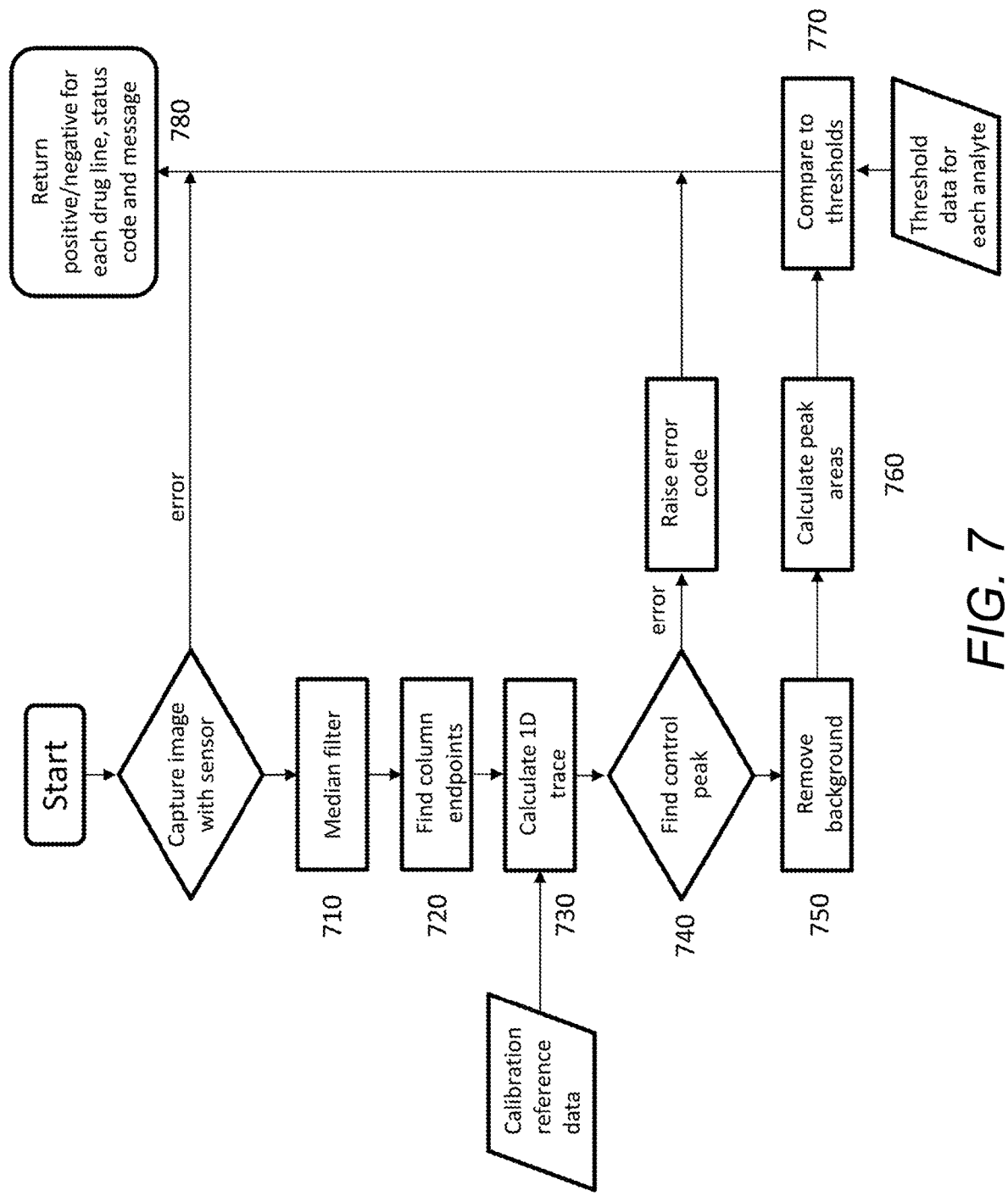
FIG. 7 shows a flowchart of the image processing method used to produce a value indicative of the fluorescent emission from a substrate in accordance with an embodiment of the disclosure.

An image processing method used to produce a value indicative of fluorescent emission from a substrate is indicated in FIG. 7. The substrate of which an image is taken is similar to that in FIG. 5, with a plurality of vertical strips of fluorescent material spaced horizontally across the substrate 110.

Figure 8B:
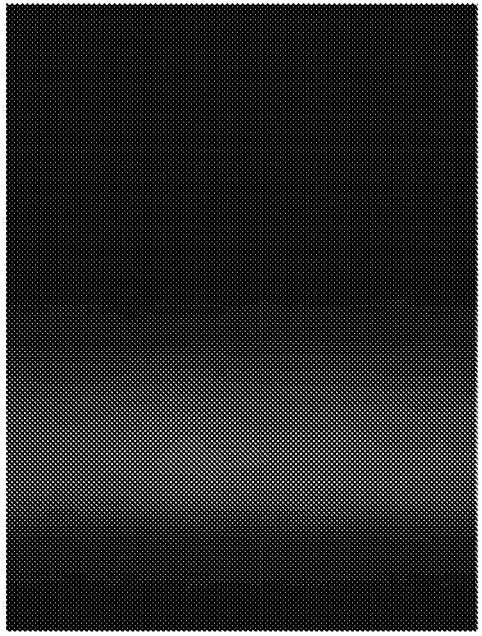
FIG. 8B shows the effect of applying the median filter to the image in FIG. 8A, in accordance with an embodiment of the disclosure.
Figure 8A:
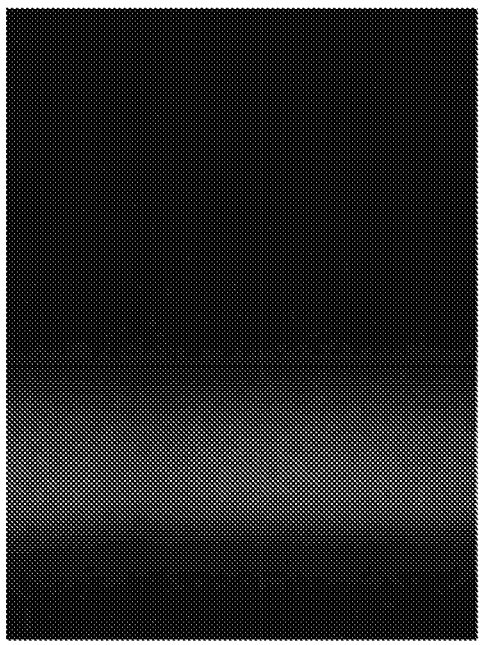
FIG. 8 shows the effects of applying a median filter to the image of the substrate, where

At step 710, a median filter is applied to remove any 'salt and pepper' noise, for example as caused by electronic noise or by dead pixels in the sensor. FIG. 8A shows an image of a strip of fluorescent material before a median filter is applied, and FIG. 8B shows the same image after the median filter has been applied.

Figure 9:
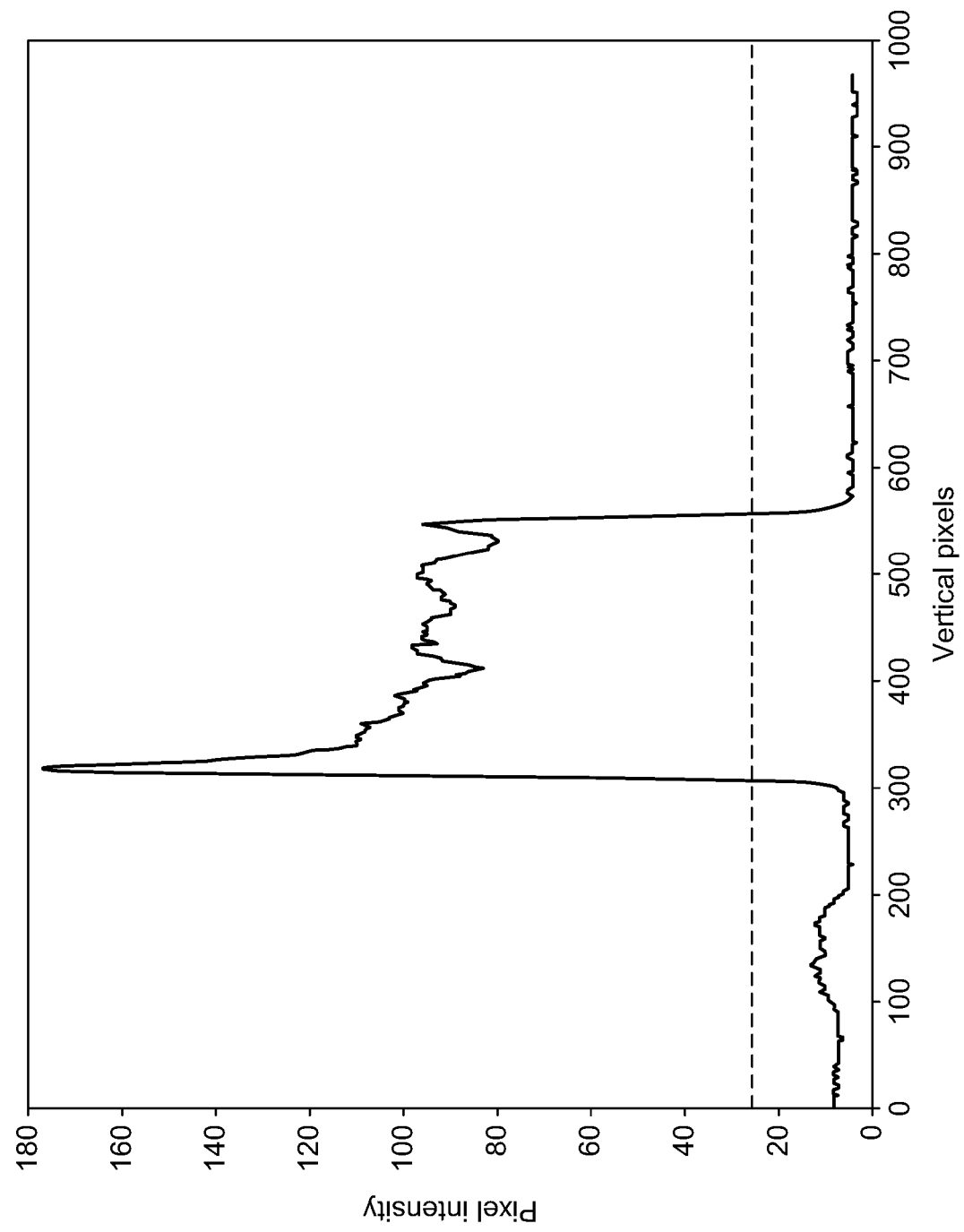
FIG. 9 shows the intensity of the fluorescent radiation for a column of pixels in an image of a strip of fluorescent material in accordance with an embodiment of the disclosure.

Referring again to FIG. 7, at step 720 the endpoints of the strips of fluorescent material are found. Splitting the image into columns of vertical pixels, for each column the intensity of each pixel is compared to a threshold. The smallest and largest pixel indices are found for which the pixel intensity exceeds the threshold. These values define the lower and upper bounds for integration and are stored in the memory of a controller. The step is carried out for each column of pixels. FIG. 9 shows an example of a plot of pixel intensity against vertical pixel index for a pixel column containing an image of a fluorescent strip. The threshold is shown as a dashed line.

Figure 10:
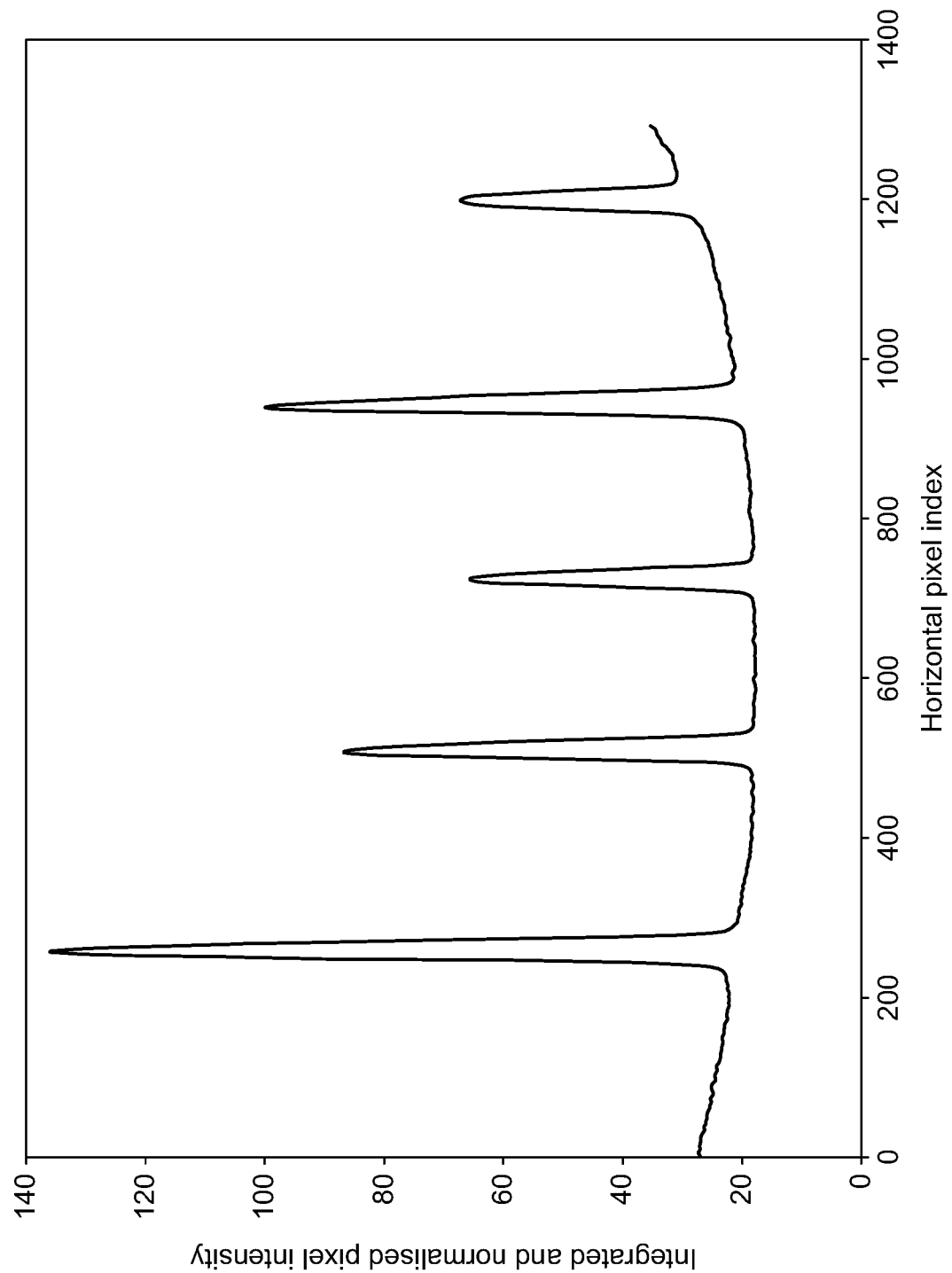
FIG. 10 shows the 1D trace of the integrated intensity of the fluorescent radiation as a function of horizontal pixel position, where the integrated intensity is found by summing the intensities in the column of pixels in accordance with an embodiment of the disclosure.

At this stage of the process, any residual variation in the excitation radiation at the substrate must be accounted for. Calibration reference data stored in the device is used to modify the image. The calibration reference data is indicative of the variations in intensity of the excitation radiation, and may be derived from measurement of a calibration substrate that has a uniform fluorescent element. The test image is divided pixel-by-pixel by the calibration reference data. The modified image is then used in step 730 to calculate a 1D trace of intensity. This is achieved by summing the pixel intensities along the columns of pixels, within the column endpoints defined in step 720. This integrated intensity is then plotted against the horizontal pixel index to give a 1D trace indicating the total intensity of each pixel column. This is shown plotted in FIG. 10.

Figure 11:
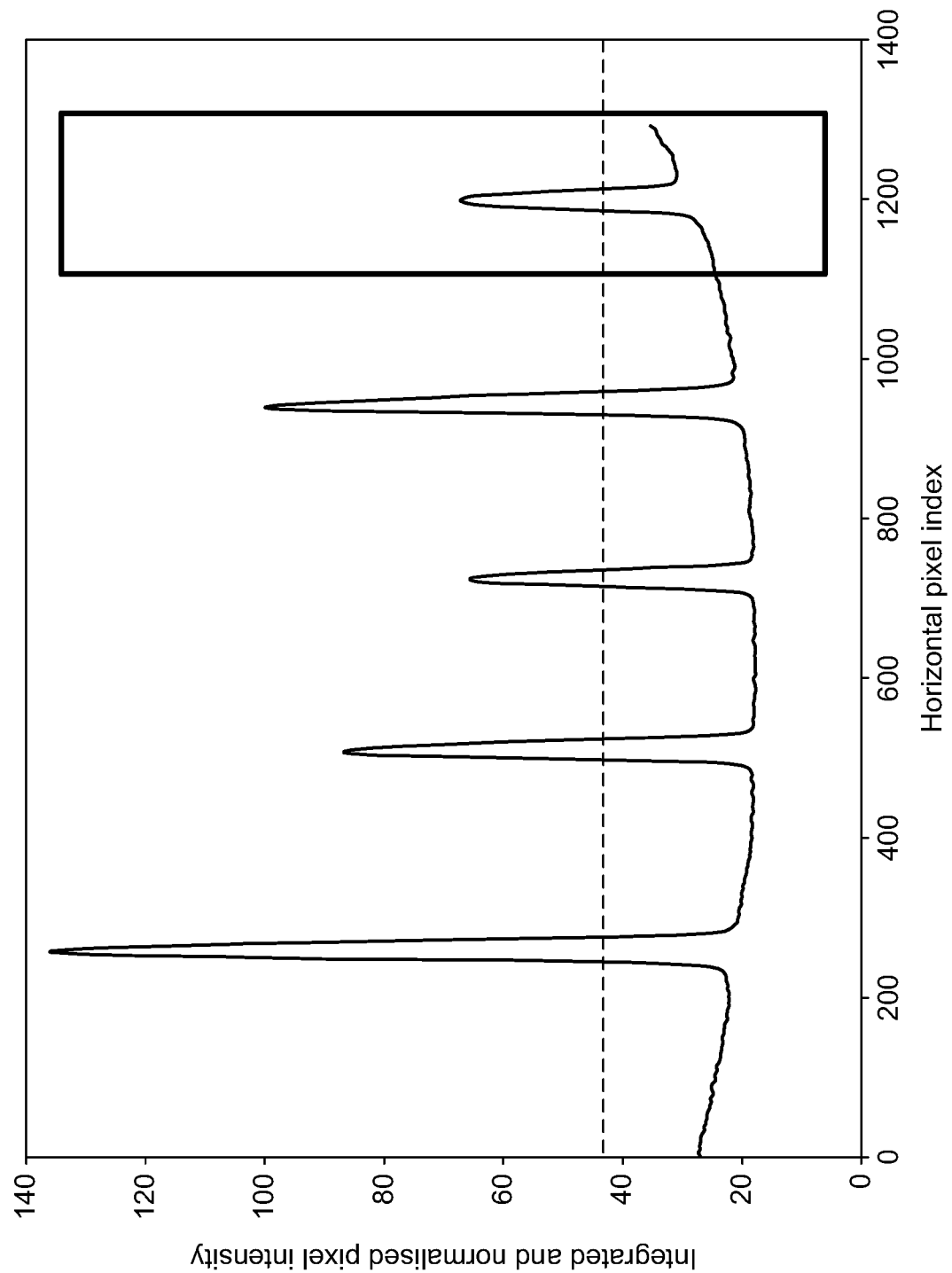
FIG. 11 shows the 1D trace of the integrated intensity of the fluorescent radiation as a function of horizontal pixel position and indicates the region in which the control strip is expected to be found and the threshold to which the intensities are compared to find the control strip, in accordance with an embodiment of the disclosure.

Test substrates such as that pictured in FIG. 5 may have a control test strip at one end. At step 740 the control strip is found by finding the pixel indices that have pixel intensities exceeding a threshold in the region where the control strip is expected to be found (this region is indicated by the box in FIG. 11, and the threshold is indicated as a dashed line).

Figure 12:
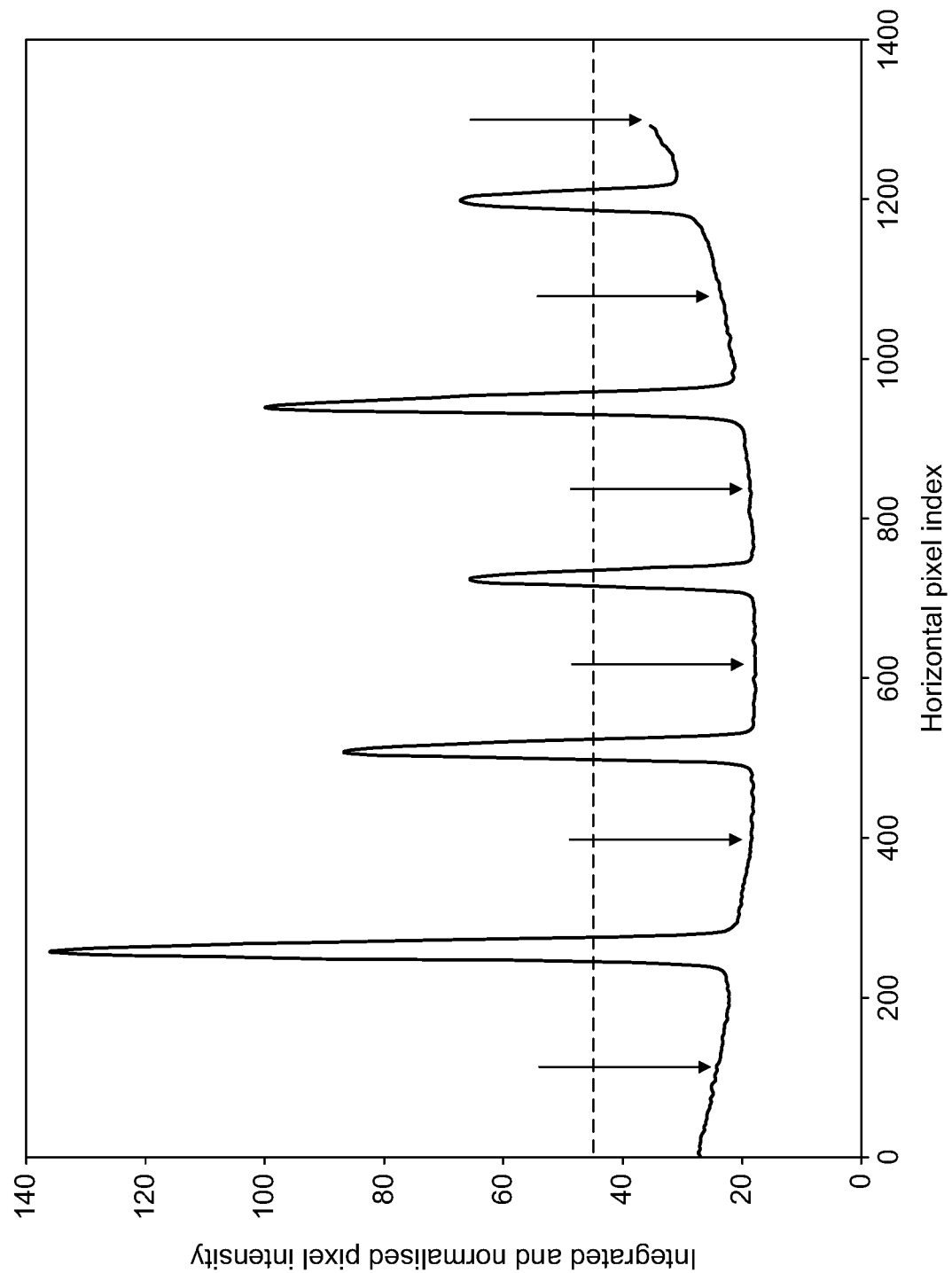
FIG. 12 shows the 1D trace of the integrated intensity of the fluorescent radiation as a function of horizontal pixel position and indicates the background regions of the signal, in accordance with an embodiment of the disclosure.
Figure 13A:
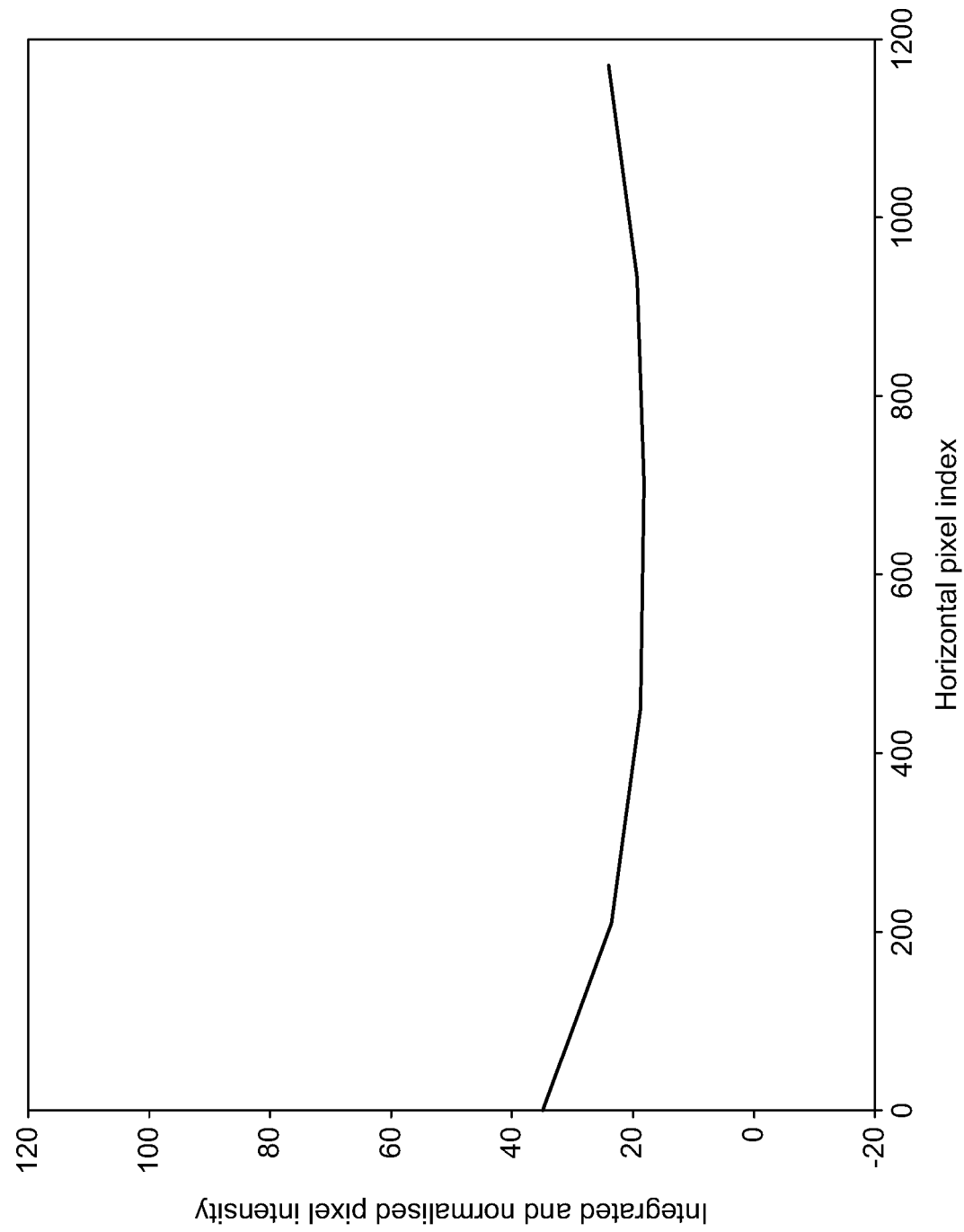
FIG. 13A shows the background signal, and 13B shows the 1D trace of the integrated intensity of the fluorescent radiation as a function of horizontal pixel position with the background signal removed in accordance with an embodiment of the present disclosure.
Figure 13B:
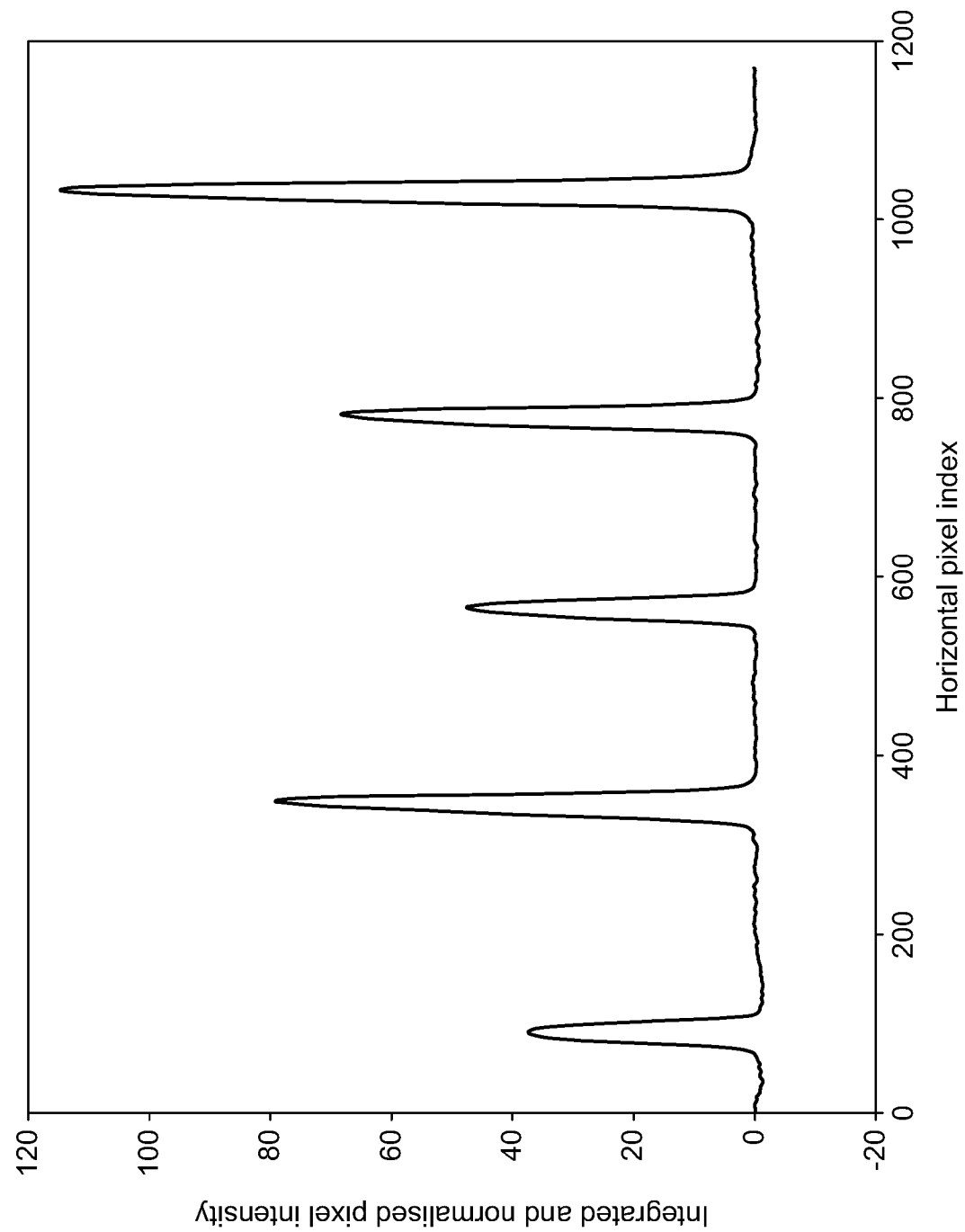

The average strip separation is known, so using the position of the control strip the positions of other strips can be calculated. Therefore regions of the 1D trace which are known to consist only of background signal can be found at the midpoints between the strips. The signal at the chosen background region can be integrated over a small window to find the background signal intensity at each background region. Arrows indicate the background regions in FIG. 12. A background trace, shown in FIG. 13A, is calculated by linear interpolation between consecutive background signal intensities and is indicative of residual non-uniformity in the excitation radiation. This background trace is subtracted from the 1D trace to obtain the corrected trace shown in FIG. 13B. This occurs in step 750.

Figure 14A:
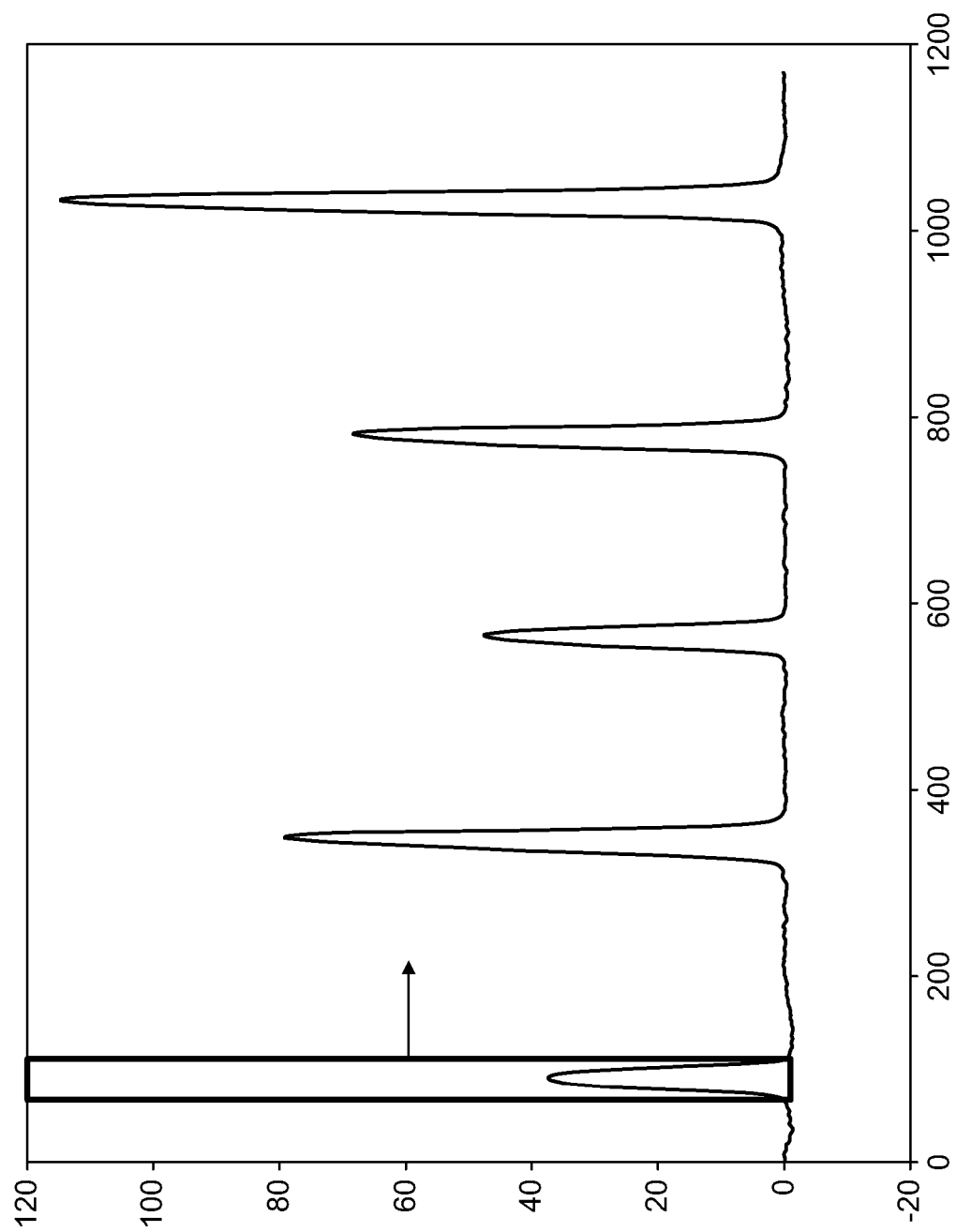
FIG. 14A shows the sliding window used for integration.
Figure 14B:
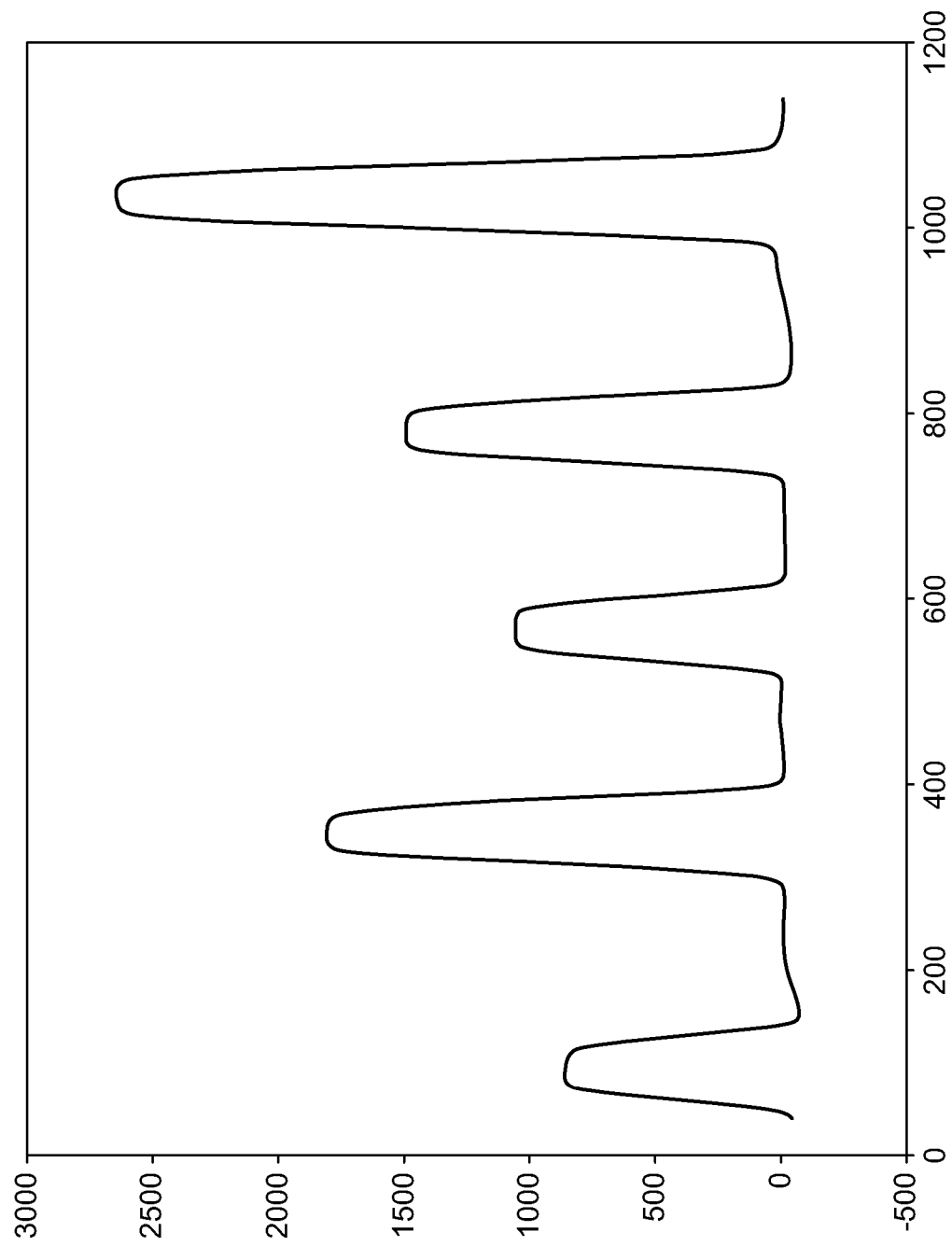
FIG. 14B shows the integrated intensity plotted as a function of the centroid of the sliding integration window in accordance with an embodiment of the present disclosure.

The area of each peak gives the total fluorescence intensity in the corresponding strip of fluorescent material. The area is calculated in step 760 by sweeping a sliding window across the 1D trace, and integrating within the window. The width of the window should be approximately that of the strip of fluorescent material (and therefore approximately the width of a peak). The window is indicated in FIG. 14A. The integrated pixel intensity is then plotted against the position of the centroid of the sliding window. The result is shown in FIG. 14B. The height of each peak corresponds to the total fluorescence intensity of the corresponding strip of fluorescent material. The intensity of each strip is divided by that of the control strip to give a ratio. The ratio is compared to a threshold to determine whether the test is positive or negative for that particular analyte. The threshold values are known for each analyte and correspond to a particular quantity of the analyte. In a certain embodiment, the analyte may be a metabolite that is indicative of a particular drug. The threshold is chosen to be the ratio which occurs for a certain dose of the drug. This is calculated using a drug calibration standard of known concentration, by depositing a quantity of metabolite indicative of the chosen dose onto the substrate, and calculating the ratio of the intensity of the fluorescent radiation of the test strip to the control strip. This threshold ratio is stored in the device, and in subsequent measurements the ratio of the intensity of the test strip to the control strip is compared to the threshold ratio. The threshold ratio is indicative of a certain known quantity of analyte. A positive result for the analyte indicates that it is present in larger quantities than in the calibration standard (as would be indicated by the threshold ratio), and a negative result indicates that it is present in smaller quantities than in the calibration standard. In an embodiment, there may be a plurality of test strips, each of which corresponds to a different metabolite and has a different associated threshold ratio.

The device of this disclosure may be used to analyse fluorescent material on a substrate, wherein the fluorescent material binds to a particular analyte. This can be applied to drug detection if an analyte is indicative of the presence of a metabolite that results from drug use. When a human intakes a substance (e.g. by ingestion, inhalation or injection) the substance may be metabolised by the human body giving rise to secondary substances known as metabolites. The presence of a particular metabolite can be indicative of a specific intake substance. The intake substance and/or metabolites may be present in sweat and, as such, may be left behind in a skin-print, e.g. a fingerprint. Detection of such metabolites in a skin-print can be used as a non-invasive method of testing for recent lifestyle activity such as (but not limited to) drug use, or compliance with a pharmaceutical or therapeutic treatment regime.

Importantly, the taking of a skin-print is much simpler than obtaining other body fluids such as blood, saliva and urine, and is more feasible in a wider range of situations. Not only this but since the appearance of the skin-print itself provides confirmation of the identity of the person providing the skin-print, there can be greater certainty that the substance or substances in the skin-print are associated with the individual. This is because substitution of a skin-print, particularly a fingerprint, is immediately identifiable from appearance whereas substitution of, for example, urine, is not immediately identifiable from appearance. As such, testing for one or more substances in a skin-print provides a direct link between the one or more substances and the identity of the human providing the skin-print. It is important, therefore, that a substrate on which a skin-print is collected cannot be contaminated (either innocently or maliciously) before or after the impression of the skin is taken. The substrate must be accessible only for the short period during which the skin-print is taken. It is also desirable for metabolite detection not only to be reliable but also to be simple, efficient and user-friendly. Furthermore, since a volume of metabolite that, if present, might be expected in a fingerprint is likely to be of the order of microliters, it is desirable to maximise the proportion of the skin-print that is analysed in order to maximise accuracy of the test.

This is achieved in WO 2016/135497 by a lateral flow device which receives a skin-print, and uses a buffer solution to draw the metabolites towards a test region. Lateral flow analysis is known in the art. Lateral flow immunoassays are simple tests for rapid detection of the presence or absence of a target analyte in a sample for home testing, point of care testing, or laboratory applications. Lateral flow devices preferably utilise a solid support through which a mobile phase (e.g., a buffer solution) can flow through by capillary action to a reaction matrix where a detectable signal, such as colour changes or colour differences at a test site, may be generated to indicate the presence or absence of the target analyte. As used herein, the term "capillary action" refers to the process by which a molecule is drawn across the lateral test device due to such properties as surface tension and attraction between molecules.

The lateral flow device described herein comprises a sample receiving portion for receiving a sample to be analysed; a solution capsule having a sealed configuration in which the solution capsule is sealed and a release configuration in which contents of the solution capsule are released via a flow path that provides fluid communication between the solution capsule and the sample receiving portion; and a bistable release mechanism comprising an actuator wherein the bistable release mechanism releases only in the event that a force applied to the actuator reaches a threshold force and wherein actuation of the actuator results in one-way conversion of the solution capsule from the sealed configuration into the release configuration.

In this way, a skin-print, most likely a fingerprint, may be securely received and reliably analysed for presence of one or more chemical species. In a further aspect, there is provided a device for receiving and analysing a sample, wherein the analysing involves use of a solution, the device comprising a first sample receiving portion comprising a wicking material for receiving a sample to be analysed using the solution; and a second sample receiving portion comprising a non-porous substrate.

The lateral flow device as described herein is for use in an immunoassay i.e. a method for analysing a sample comprising above 0.1 pg of analyte. The immunoassay comprises a competitive binding assay, where any labelled probe (e.g. antibody) not bound to analyte provides an identifiable signal in the test site whilst any labelled probe bound to analyte, e.g. in the form of an immunocomplex, passes through the test site and does not provide an identifiable signal in the test site. As the number of analyte molecules present in the sample increases, the amount of unbound labelled probe passing through the test site decreases. Thus the higher the level of analyte in the sample, the weaker the identifiable signal at the test site will be. Such a device/method allows qualitative tests to be undertaken, i.e. whether or not the sample contains an analyte of interest. Such a device/method also may also allow quantitative tests to be undertaken by measuring the intensity of the signal at the test site, whereby the higher the intensity of the signal, the lower the amount of analyte in the sample. In the context of a lateral flow device receiving a skin-print, a solution is released in a controlled fashion onto a solution receiving region and is drawn (wicked) down a substrate towards a skin-print receiving region. The solution is selected to dissolve chemical species that may be present in the skin-print receiving region, such as an analyte of interest that may be present in a skin-print on the skin-print receiving region. The solution (which may or may not now include the analyte of interest) continues to be drawn down the substrate into an analysis region. The analysis region of the substrate may have a reduced width by comparison with the skin-print receiving region, to assist in concentrating the solution into a smaller area. The analysis region comprises a competitive binding assay having a label. If present, the analyte of interest will bind to the labelled assay. The label may comprise a fluorescent tag. The analysis region further comprises a result line. The result line comprises a further molecule, a protein-analyte conjugate, which is fixed in position (immobilised) on the substrate. The protein-analyte conjugate is chosen to bind with the assay in the event that the assay has not already been bound to the analyte of interest. Hence, if the analyte of interest is present, all available assay binding sites are occupied, the further molecule cannot bind with the assay and so the assay passes through. If, however, the analyte of interest is absent, the further molecule binds with the assay which is then fixed in position on the substrate. Since the assay is labelled, once sufficient assay is fixed in position, the label becomes apparent through, for example, a change in colour. That is to say, the result line appears to change colour. The label may be fluorescent. In addition to the result line, there may also be a control line. The control line may be configured to capture a control assay that is present in the buffer solution. The purpose of the control line may be to show that the reaction conditions were as expected even when the result line does not change colour (indicating that an insufficient presence of the analyte of interest).

The analysis region of the substrate may be quantitatively analysed using the device of this disclosure, which measures the total intensity of the fluorescent radiation emitted from each result line and the control line. The ratio of the intensity in a result line to the control line is compared to a threshold value to determine whether the analyte is present. There may be a correlation between the amount of analyte present and the ratio of the intensity of the fluorescent radiation in the result line to the control line.

The invention claimed is:

1. A device configured to provide a value indicative of fluorescent emission from a substrate having a test region, the device comprising:
   a. an electromagnetic radiation source configured to emit excitation radiation towards the test region to excite fluorescent emission from a fluorescent material in the test region, the electromagnetic radiation source configured such that a variation in intensity of the excitation radiation across the test region is less than 15%;
   b. a sensor having a field of view covering the test region and configured to capture a primary image of the fluorescent emission; and
   c. a controller configured:
      i. to modify the primary image based on calibration data indicative of variations in intensity of the excitation radiation to produce a modified image; and
      ii. to use the modified image to obtain the value indicative of fluorescent emission.

2. The device of claim 1, further comprising a beam splitter that transmits the excitation radiation emitted by the electromagnetic radiation source and reflects the fluorescent emission, and optionally further comprising one or both of:
   a narrow band pass filter centred about a wavelength of the fluorescent emission; and
   a short pass filter that limits transmission of electromagnetic radiation that has a range of wavelengths that overlaps with the wavelengths of the fluorescent emission.

3. The device of claim 1 wherein the variation in intensity of the excitation radiation across the test region is less than 5%.

4. The device of claim 1 wherein the excitation radiation across the test region is above a threshold of intensity.

5. The device of claim 1 wherein the controller is configured to correct for non-uniformities in an illumination field by dividing a test image pixel-by-pixel by the calibration data.

6. The device of claim 1 wherein the controller is further configured to remove a background signal from an integrated intensity of the fluorescent radiation.

7. The device of claim 1 wherein the test region comprises a control strip and a test strip.

8. The device of claim 7 wherein the controller is further configured to obtain a first value indicative of fluorescent emission of the test strip and a second value indicative of fluorescent emission of the control strip, and to divide the first value by the second value to provide a ratio.

9. The device of claim 8 wherein the ratio is compared to a threshold value.

10. The device of claim 8 wherein the test strip is one of a plurality of test strips.

11. The device of claim 1 wherein the calibration data is derived from measurement of fluorescent emission of a calibration substrate and is indicative of variation in the intensity of the excitation radiation from the electromagnetic radiation source.

12. The device of claim 10 further comprising a calibration substrate with a uniform fluorescing element that has a spectral emission with a range of wavelengths that has a high degree of overlap with a range of wavelengths emitted by the fluorescent substance on the test region of the substrate.

13. The device of claim 1, wherein:
the sensor comprises a complementary metal oxide semiconductor sensor; and/or
the electromagnetic radiation source comprises one or more of:
two light-emitting diodes; and
blue light-emitting diodes.

* * * * *